(12) United States Patent
Zhou (10) Patent No.: US 11,257,005 B2
(45) Date of Patent: Feb. 22, 2022

(54) TRAINING METHOD AND TRAINING SYSTEM FOR MACHINE LEARNING SYSTEM

(71) Applicant: Alibaba Group Holding Limited, Grand Cayman (KY)

(72) Inventor: Jun Zhou, Hangzhou (CN)

(73) Assignee: Alibaba Group Holding Limited

( * ) Notice: Subject to any disclaimer, the term of this patent is extended or adjusted under 35 U.S.C. 154(b) by 837 days.

(21) Appl. No.: 16/119,585

(22) Filed: Aug. 31, 2018

(65) Prior Publication Data

US 2018/0365595 A1    Dec. 20, 2018

Related U.S. Application Data

(63) Continuation of application No. PCT/CN2017/074318, filed on Feb. 21, 2017.

(30) Foreign Application Priority Data

Mar. 4, 2016    (CN) .......................... 201610125904.6

(51) Int. Cl.
| | |
|---|---|
| *G06N 20/00* | (2019.01) |
| *G06N 20/20* | (2019.01) |
| *G06F 16/00* | (2019.01) |
| *G06N 5/00* | (2006.01) |
| *G06N 5/04* | (2006.01) |

(52) U.S. Cl.
CPC .............. *G06N 20/00* (2019.01); *G06F 16/00* (2019.01); *G06N 20/20* (2019.01); *G06N 5/00* (2013.01); *G06N 5/045* (2013.01)

(58) Field of Classification Search
None
See application file for complete search history.

(56) References Cited

U.S. PATENT DOCUMENTS

| | | |
|---|---|---|
| 2007/0162406 A1 | 7/2007 | Lanckriet |
| 2007/0233679 A1 | 10/2007 | Liu et al. |
| | (Continued) | |

FOREIGN PATENT DOCUMENTS

| | | |
|---|---|---|
| CN | 102176698 A | 9/2011 |
| CN | 102737126 A | 10/2012 |
| | (Continued) | |

OTHER PUBLICATIONS

Lazarevic, Aleksandar, and Zoran Obradovic. "Boosting algorithms for parallel and distributed learning." Distributed and parallel databases 11.2 (2002): 203-229. (Year: 2002).*

(Continued)

*Primary Examiner* — Vincent Gonzales
(74) *Attorney, Agent, or Firm* — Lee & Hayes, P.C.

(57) ABSTRACT

A training method and a training system for a machine learning system are provided. The method includes allocating training data to a plurality of working machines; dividing training data allocated by each working machine into a plurality of data pieces; obtaining a local weight and a local loss function value calculated by each working machine based on each data piece; aggregating the local weight and the local loss function value calculated by each work machine based on each data piece to obtain a current weight and a current loss function value; performing model abnormality detection using the current weight and/or the current loss function value; inputting a weight and a loss function value of a previous aggregation to the machine learning system for training in response to a result of the model abnormality detection being a first type of abnormality; and modifying the current weight and/or the current loss function value to a current weight and/or a current loss function value within a first threshold in response to the result of the model abnormality detection being a second type of abnor- (Continued)

mality, and inputting thereof to the machine learning system for training.

20 Claims, 7 Drawing Sheets

(56) References Cited

U.S. PATENT DOCUMENTS

| | | |
|---|---|---|
| 2010/0023467 A1 | 1/2010 | Iwakura et al. |
| 2015/0206066 A1 | 7/2015 | Abu-Mostafa et al. |
| 2017/0220949 A1 | 8/2017 | Feng et al. |

FOREIGN PATENT DOCUMENTS

| | | |
|---|---|---|
| CN | 103425996 A | 12/2013 |
| CN | 103853614 A | 6/2014 |
| CN | 104008420 A | 8/2014 |
| CN | WO2014160648 A1 | 10/2014 |
| JP | 2001344590 A | 12/2001 |
| JP | 2009288933 A | 12/2009 |
| JP | 2012022558 A | 2/2012 |

OTHER PUBLICATIONS

Peteiro-Barral, Diego, and Bertha Guijarro-Berdiñas. "A survey of methods for distributed machine learning." Progress in Artificial Intelligence 2.1 (2013): 1-11. (Year: 2013).*

Japanese Office Action dated Apr. 13, 2021 for Japanese Patent Application No. 2018-546445, a foreign counterpart of U.S. Appl. No. 16/119,585, 6 pages.

Abade, et. al., "A parallel genetic local search algorithm for intrusion detection in computer networks", Engineering Applications of Artificial Intelligence, Pineridge Press, vol. 20, No. 8, Oct. 31, 2007, pp. 1058-1069.

Translation of CN Office Action from Corresponding CN Application No. 201610125904.6 dated Dec. 12, 2019, a counterpart foreign application for U.S. Appl. No. 16/119,585, 6 pages.

Translation of CN Search Report from Corresponding CN Application No. 201610125904.6 dated Dec. 4, 2019, a counterpart foreign application for U.S. Appl. No. 16/119,585, 1 pages.

The Extended European Search Report dated Oct. 30, 2019, fofr European Patent Application No. 17759165.8, 8 pages.

Translation of International Search Report for corresponding PCT Application PCT/CN2017/074318, dated Jun. 2, 2017, a counterpart foreign application for U.S. Appl. No. 16/119,585, 2 pages.

Omar, et. al., "Machine Learning Techniques for Anomaly Detection: An Overview", International Journal of Computer Applications (0975-8887), vol. 79, No. 2, Oct. 1, 2013, 15 pages.

Translation of Written Opinion for corresponding PCT Application PCT/CN2017/074318, dated Jun. 2, 2017, a counterpart foreign application for U.S. Appl. No. 16/119,585, 4 pages.

European Office Action dated Oct. 27, 2021 for European Patent Application No. 17759165.8, a foreign counterpart to U.S. Appl. No. 16/119,585, 6 pages.

* cited by examiner

TRAINING METHOD AND TRAINING SYSTEM FOR MACHINE LEARNING SYSTEM

CROSS REFERENCE TO RELATED PATENT APPLICATIONS

This application claims priority to and is a continuation of PCT Patent Application No. PCT/CN2017/074318 filed on 21 Feb. 2017, and is related to and claims priority to Chinese Patent Application No. 201610125904.6, filed on 4 Mar. 2016, entitled "Training Method and Training System for Machine Learning System," which are hereby incorporated by reference in their entirety.

TECHNICAL FIELD

The present disclosure relates to the technical field of big data processing, and particularly to training methods and systems for a machine learning system.

BACKGROUND

Nowadays, providing good service to users is a goal that all Internet companies hope to achieve. To this end, most companies use machine learning to capture user preferences and habits and provide personalized services. For example, each website can use a machine learning system to collect online behavioral data of users, and provide different search results to users of different genders/ages, in order to provide services according to preferences of the users to the greatest extent.

The machine learning system described above can collect a large number of user behavior data, such as user browsing/clicking/purchasing/top posting/posting comments on posts, etc., and using some machine learning algorithms to train the machine learning system offline. After obtaining a predictive model, the predictive model is placed on an online system to provide services to users. For example, a recommendation system can recommend different products to different users based on the users' past behavior logs (such as including logs of yesterday and without 2 weeks from yesterday), after learning preferences of the users.

This way of using past user behavior data to perform training offline and obtain a model is called offline learning. However, under normal circumstances, user behavior and interests may change significantly within one day. Since a log generated by a user in an offline learning system cannot be immediately added to the system for training, offline learning obviously cannot capture this change.

Online learning means that a model continuously updates the model itself as new training data is received, and therefore can achieve better results. The accuracy of online learning is relatively high, but since a time period of data collection is relatively short, the model is prone to be influenced by the noise in the data, which makes the training of the model unstable. At the same time, since the online learning adopts a method of asynchronous update model, the training data continuously flows into the model, and the model is constantly updated and learning. The training of the model is often stuck due to certain uncontrollable issues, and a failure in the training occurs, which results in a failure to produce a usable model, thus affecting online services, and damaging the user experience.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, embodiments of the present disclosure are proposed to provide a training method and a training system for a machine learning system to overcome the above problems or at least partially solve the above problems.

In order to solve the above problems, the present disclosure discloses a training method for a machine learning system, which trains the machine learning system using training data. The training method includes allocating the training data to a plurality of working machines; dividing training data allocated by each working machine into a plurality of data pieces; obtaining a local weight and a local loss function value calculated by each working machine based on each data piece; aggregating the local weight and the local loss function value calculated by each work machine based on each data piece to obtain a current weight and a current loss function value; performing model abnormality detection using the current weight and/or the current loss function value; inputting a weight and a loss function value of a previous aggregation to the machine learning system for training in response to a result of the model abnormality detection being a first type of abnormality; and modifying the current weight and/or the current loss function value to a current weight and/or a current loss function value within a first threshold, and inputting thereof to the machine learning system for training, in response to the result of the model abnormality detection being a second type of abnormality.

The embodiments of the present disclosure have at least the following advantages.

According to a training method and a training system for a machine learning system proposed by the embodiments of the present disclosure, each work machine processes only one data piece at a time, and a local weight and a local loss function value calculated according to the data piece are aggregated, thus achieving an effect of accurately updating a weight and a loss function value in a small extent after each calculation, and avoiding the problems of online learning being susceptible to noise in data in existing technologies. At the same time, abnormality detection is performed after obtaining a current weight and/or a current loss function value. In response to detecting that the obtained current weight and/or the obtained current loss function value belong(s) to a first type of abnormality or a second type of abnormality, the current weight and/or the current loss function value that is/are calculated in this calculation may be discarded, and a weight and a loss function value obtained from a previous aggregation are inputted into a machine learning model; or the current weight and/or the current loss function value that is/are calculated at this time are corrected, and updates of a weight and a loss function value obtained by each calculation and aggregation are limited to effective ranges. This avoids the instability of model training, enhances the ability of the system to resist data noise, improves the stability of the machine learning system of online learning, ensures the normal output of the machine learning system, and improves the service capabilities of the machine learning system after going online.

DETAILED DESCRIPTION

The technical solutions in the embodiments of the present disclosure are clearly and completely described hereinafter with reference to the drawings in the embodiments of the present disclosure. Apparently, the described embodiments merely represent some and not all of the embodiments of the present disclosure. All other embodiments obtained by one of ordinary skill in the art based on the embodiments of the present disclosure fall within the scope of protection of the present disclosure.

The present disclosure proposes a training method for a machine learning system. The training method includes first allocating the training data to a plurality of working machines; dividing training data allocated by each working machine into a plurality of data pieces; obtaining a local weight and a local loss function value calculated by each working machine based on each data piece; and aggregating the local weight and the local loss function value calculated by each work machine based on each data piece to obtain a current weight and a current loss function value; performing model abnormality detection using the current weight and/or the current loss function value; inputting a weight and a loss function value of a previous aggregation to the machine learning system for training in response to a result of the model abnormality detection being a first type of abnormality; and correcting the current weight and/or the current loss function value to a current weight and/or a current loss function value within a first threshold, and inputting thereof to the machine learning system for training, in response to the result of the model abnormality detection being a second type of abnormality.

First Embodiment

Figure 1:
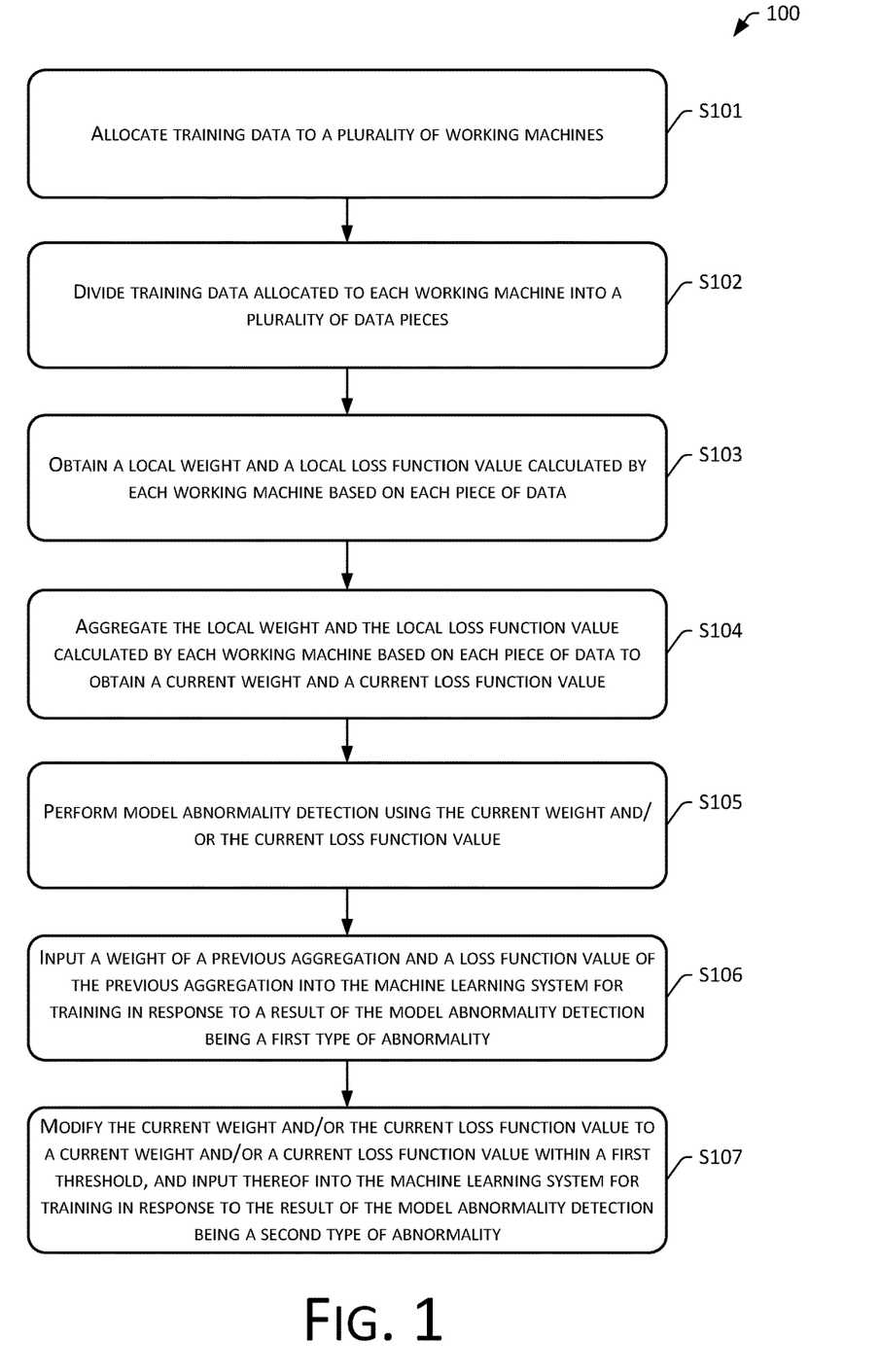
FIG. 1 is a flowchart of a training method for a machine learning system in accordance with a first embodiment of the present disclosure.

The first embodiment of the present disclosure provides a training method for a machine learning system. FIG. 1 is a flowchart of a training method 100 for a machine learning system according to the first embodiment of the present disclosure. In implementations, the machine learning system may be a distributed machine learning system, which includes a parameter server. The parameter server may include, for example, a plurality of working machines (workers or slaves), a plurality of servers, and a coordinator. As shown in FIG. 1, the training method 100 may include the following operations.

Operation S101: Allocate training data to a plurality of working machines.

In this operation, for example, each working machine can read training data thereof according to identification thereof, and data does not overlap among working machines. This operation may, for example, be divided by a coordinator into training data belonging to each working machine according to an id of each working machine, and respective training data is read by a corresponding working machine.

Operation S102: Divide training data allocated to each working machine into a plurality of data pieces.

In this operation, for example, each working machine divides training data assigned thereto into a plurality of pieces of data based on its own system configuration, and each processing of each working machine is processing based on one piece of data. In other words, each work machine processes only one piece of data at a time.

Operation S103: Obtain a local weight and a local loss function value calculated by each working machine based on each piece of data.

In this operation, for example, in each working machine calculates and obtains a local weight and a local loss function value corresponding to the respective working machine in this calculation based on a piece of data in the training data obtained by the respective working machine. Since the machine learning system includes a plurality of working machines, a number of local weights and local loss function values obtained by the plurality of working machines in this calculation can be obtained in this operation.

Operation S104: Aggregate the local weight and the local loss function value calculated by each working machine based on each piece of data to obtain a current weight and a current loss function value.

In this operation, for example, each working machine sends the calculated local weight and the calculated local loss function value to a server. The server aggregates multiple local weights and local loss function values that are calculated by multiple working machines at the current time, and obtains a current weight and a current loss function value. A process of aggregation includes, but is not limited to, addition, averaging after addition, and the like, which is not particularly limited by the present invention.

After a local weight and a local loss function value are calculated by each working machine in operation S103, the local weight and the local loss function value may be asynchronously transmitted to a server. A coordinator may drive the server to perform aggregation of a plurality of local weights and local loss functions in operation S104.

Operation S105: Perform model abnormality detection using the current weight and/or the current loss function value.

In this operation, for example, the current weight and/or the current loss function value that is/are aggregated may be inputted to a model anomaly detecting apparatus to detect whether a model is abnormal according to a preset condition. A detection result may be, for example, normal, a first type of abnormality, and a second type of abnormality. Corresponding processing is performed separately for the three cases.

In an embodiment, input values of the model abnormality detection apparatus are the current weight, the current loss function value, a weigh of a previous aggregation, and a loss function value of the previous aggregation. The weight of the previous aggregation is obtained by summarizing previous local weights loss function value calculated by each work machine based on data pieces used in a previous calculation. The loss function value of the previous aggregation is calculated summarizing by previous loss function values that are calculated by each work machine based on the data pieces used in the previous calculation.

Operation S106: Input a weight of a previous aggregation and a loss function value of the previous aggregation into the machine learning system for training in response to a result of the model abnormality detection being a first type of abnormality.

In this operation, for example, if a detection result is a first type of abnormality, the local weight and local loss function value obtained by each working machine in the current calculation and the current weight and current loss function value after the aggregation are ignored or deleted. A weight of a previous aggregation and a loss function value of a previous aggregation are inputted into the machine learning system for training.

Operation S107: Modify the current weight and/or the current loss function value to a current weight and/or a current loss function value within a first threshold, and input thereof into the machine learning system for training in response to the result of the model abnormality detection being a second type of abnormality.

In this operation, for example, a detection result is a second type of abnormality, and a model fine adjustment apparatus can be entered, the current weight and/or the current loss function value is/are subtracted by a preset first threshold to obtain a value of each element of the current weight and/or the current loss function value within the first threshold, which is/are entered into the machine learning system for training. In particular, after the current weight and/or the current loss function value still fail(s) to fall within the first threshold after being subtracted by the preset first threshold at the first time, processing of subtracting the current weight and/or the current loss function value by the first threshold may be performed one or more times until the value of each element falls within the first threshold.

According to a training method for a machine learning system proposed by the first embodiment of the present disclosure, each work machine processes only one data piece at a time, and a local weight and a local loss function value calculated according to the data piece are aggregated, thus achieving an effect of accurately updating a weight and a loss function value in a small extent after each calculation, and avoiding the problems of online learning being susceptible to noise in data in existing technologies. At the same time, abnormality detection is performed after obtaining a current weight and/or a current loss function value. In response to detecting that the obtained current weight and/or the obtained current loss function value belong(s) to a first type of abnormality or a second type of abnormality, the current weight and/or the current loss function value that is/are calculated in this calculation may be discarded, and a weight and a loss function value obtained from a previous aggregation are inputted into a machine learning model; or the current weight and/or the current loss function value that is/are calculated at this time are corrected, and updates of a weight and a loss function value obtained by each calculation and aggregation are limited to effective ranges. This avoids the instability of model training, enhances the ability of the system to resist data noise, improves the stability of the machine learning system of online learning, ensures the normal output of the machine learning system, and improves the service capabilities of the machine learning system after going online.

Second Embodiment

Figure 2:
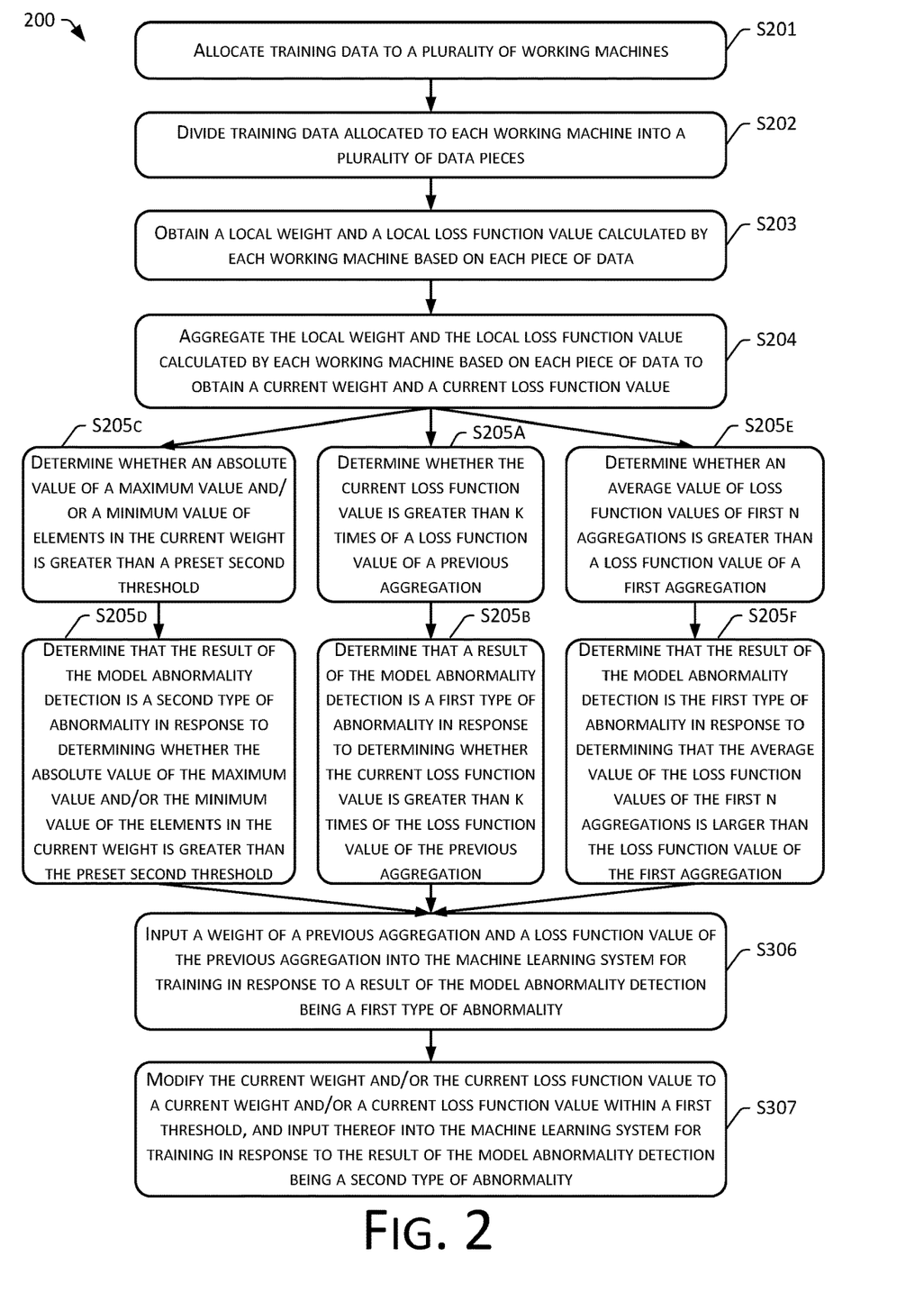
FIG. 2 is a flowchart of a training method for a machine learning system in accordance with a second embodiment of the present disclosure.

The second embodiment of the present disclosure provides a training method for a machine learning system. FIG. 2 is a flowchart of a training method 200 for a machine learning system according to the second embodiment of the present disclosure. In implementations, the machine learning system may be a distributed machine learning system. As shown in FIG. 2, the training method 200 may include the following operations.

S201: Allocate training data to a plurality of working machines.

S202: Divide training data allocated to each working machine into a plurality of data pieces.

S203: Obtain a local weight and a local loss function value calculated by each working machine based on each piece of data.

S204: Aggregate the local weight and the local loss function value calculated by each working machine based on each piece of data to obtain a current weight and a current loss function value.

S205: Perform model abnormality detection using the current weight and/or the current loss function value.

S206: Input a weight of a previous aggregation and a loss function value of the previous aggregation into the machine learning system for training in response to a result of the model abnormality detection being a first type of abnormality.

S207: Modify the current weight and/or the current loss function value to a current weight and/or a current loss function value within a first threshold, and input thereof into the machine learning system for training in response to the result of the model abnormality detection being a second type of abnormality.

Portions of the above operations S201-S207 that are identical to those of operations S101-S107 in the first embodiment are not repeatedly described herein.

In implementations, operation S205, i.e., performing the model abnormality detection using the current weight and/or the current loss function value includes:

Sub-operation S205a: Determine whether the current loss function value is greater than k times of a loss function value of a previous aggregation.

In this sub-operation, the value k can be set in advance as a basis for determining whether the current loss function value is abnormal.

Sub-operation S205b: Determine that a result of the model abnormality detection is a first type of abnormality in response to determining whether the current loss function value is greater than k times of the loss function value of the previous aggregation.

In this sub-operation, in response to determining that the current loss function value is greater than k times of the loss function value of the previous aggregation, the current loss function value calculated and aggregated in this time can be considered to be a first type of abnormality, i.e., a serious anomaly. In response to determining that the model has such an abnormality, the current weight and the current loss function value calculated in this time can be directly discarded.

In implementations, operation S205, i.e., performing the model abnormality detection using the current weight and/or the current loss function value may further include:

Sub-operation S205c: Determine whether an absolute value of a maximum value and/or a minimum value of elements in the current weight is greater than a preset second threshold.

In this sub-operation, the current weight is a vector consisting of N elements. After aggregating the current weight, a determination can be made as to whether an absolute value of a maximum value and/or a minimum value of each element of the vector (i.e., each dimension) is greater than a preset second threshold. The second threshold can be specified in advance.

Sub-operation S205d: Determine that the result of the model abnormality detection is a second type of abnormality in response to determining whether the absolute value of the maximum value and/or the minimum value of the elements in the current weight is greater than the preset second threshold.

In this sub-operation, in response to determining that the absolute value of at least one of the maximum value and the minimum value of the elements in the current weight is greater than the preset second threshold, the model is considered to have a second type of abnormality, i.e., a relatively minor anomaly. The current weight and the current loss function value calculated in the current calculation may be modified into a current weight and/or a current loss function value within the first threshold through correction, which is/are inputted into the machine learning system for training.

In implementations, modifying the current weight and/or the current loss function value to the local weight and/or the local loss function value within the first threshold may include subtracting element(s) having the absolute value of the maximum value and/or the minimum value being greater than the preset second threshold value by the second threshold to obtain a current weight in which each element is located within the second threshold.

In implementations, operation S205, i.e., performing the model abnormality detection using the current weight and/or the current loss function value may further include:

Sub-operation S205e: Determine whether an average value of loss function values of first n aggregations is greater than a loss function value of a first aggregation.

In this sub-operation, loss function values obtained from first n aggregations are stored, for example, in a specific storage area, and an average value of the loss function values of the first n aggregations can be calculated. A determination is made as to whether the value is greater than a loss function value obtained from the first aggregation.

Sub-operation S205f: Determine that the result of the model abnormality detection is the first type of abnormality in response to determining that the average value of the loss function values of the first n aggregations is larger than the loss function value of the first aggregation.

In this sub-operation, in response to determining that the average value of the loss function values of the first n aggregations is larger than the loss function value of the first aggregation, the model may be considered to have the first type of abnormality, i.e., a relatively serious anomaly. In response to determining that the model has such an abnormality, the current weight and the current loss function value calculated at this time can be directly discarded.

According to a training method for a machine learning system proposed by the second embodiment of the present disclosure, each work machine processes only one data piece at a time, and a local weight and a local loss function value calculated according to the data piece are aggregated, thus achieving an effect of accurately updating a weight and a loss function value in a small extent after each calculation, and avoiding the problems of online learning being susceptible to noise in data in existing technologies. At the same time, abnormality detection is performed after obtaining a current weight and/or a current loss function value. In response to detecting that the obtained current weight and/or the obtained current loss function value belong(s) to a first type of abnormality or a second type of abnormality, the current weight and/or the current loss function value that is/are calculated in this calculation may be discarded, and a weight and a loss function value obtained from a previous aggregation are inputted into a machine learning model; or the current weight and/or the current loss function value that is/are calculated at this time are corrected, and updates of a weight and a loss function value obtained by each calculation and aggregation are limited to effective ranges. This avoids the instability of model training, enhances the ability of the system to resist data noise, improves the stability of the machine learning system of online learning, ensures the normal output of the machine learning system, and improves the service capabilities of the machine learning system after going online.

Third Embodiment

Figure 3:
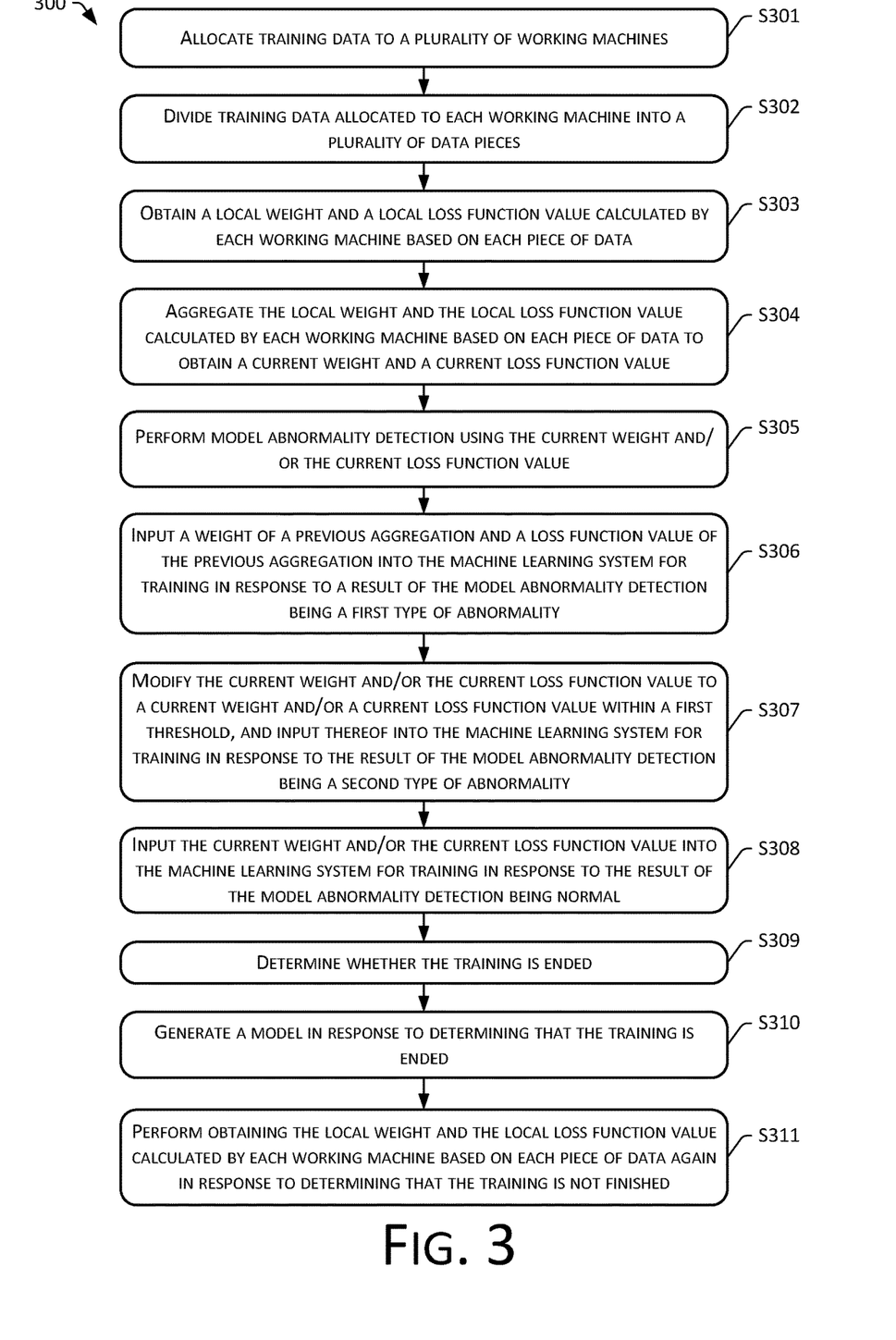
FIG. 3 is a flowchart of a training method for a machine learning system in accordance with a third embodiment of the present disclosure.

The third embodiment of the present disclosure provides a training method for a machine learning system. FIG. 3 is a flowchart of a training method 300 for a machine learning system according to the third embodiment of the present disclosure. In implementations, the machine learning system may be a distributed machine learning system. As shown in FIG. 3, the training method 300 may include the following operations.

S301: Allocate training data to a plurality of working machines.

S302: Divide training data allocated to each working machine into a plurality of data pieces.

S303: Obtain a local weight and a local loss function value calculated by each working machine based on each piece of data.

S304: Aggregate the local weight and the local loss function value calculated by each working machine based on each piece of data to obtain a current weight and a current loss function value.

S305: Perform model abnormality detection using the current weight and/or the current loss function value.

S306: Input a weight of a previous aggregation and a loss function value of the previous aggregation into the machine learning system for training in response to a result of the model abnormality detection being a first type of abnormality.

S307: Modify the current weight and/or the current loss function value to a current weight and/or a current loss function value within a first threshold, and input thereof into the machine learning system for training in response to the result of the model abnormality detection being a second type of abnormality.

Portions of the above operations S301-S307 that are identical to those of operations S101-S107 in the first embodiment are not repeatedly described herein.

In implementations, after operation S205, i.e., after performing the model abnormality detection using the current weight and/or the current loss function value, the training method may further include:

S308. Input the current weight and/or the current loss function value into the machine learning system for training in response to the result of the model abnormality detection being normal.

In implementations, when the model is normal under the current weight and the current loss function value after the current calculation and the aggregation, the current weight and/or the current loss function value may act as a valid calculation result, and inputted into the machine learning system for training.

Further, in implementations, after operation S308, i.e., inputting the current weight and/or the current loss function value into the machine learning system for training in response to the result of the model abnormality detection being normal, the method further includes:

S309: Determine whether the training is ended.

In this operation, for example, in response to detecting that the current loss function value and a loss function value after a previous aggregation are smaller than a third threshold, the training is determined to be ended. The third threshold may be a threshold detected by the system.

However, one skilled in the art can clearly understand that the determination operation is not limited to being performed by comparing a difference with a third threshold. A variety of methods for verifying whether the training is ended exist in the art, and details thereof are not exhaustively described herein.

S310: Generate a model in response to determining that the training is ended.

In this operation, in response to determining that the training is ended, i.e., a model is already usable, the model is produced. For example, the model can be applied online.

S311: Perform obtaining the local weight and the local loss function value calculated by each working machine based on each piece of data again in response to determining that the training is not finished.

In this operation, for example, in response to detecting that the current loss function value and the loss function value of the previous aggregation are larger than the third threshold, a determination is made that the training is not ended. In this case, obtaining the local weight and the local loss function value calculated by each work machine based on each piece of data may be repeatedly performed. In other words, each working machine continues to calculate a local weight and a local loss function value based on other pieces of data, and the training method is repeated for current weight(s) and current loss function value(s) obtained in subsequent aggregation(s), until a model that satisfies usage requirements is obtained.

In addition, in the solutions disclosed in the first to third embodiments, in implementations, before allocating the training data to the plurality of working machines, the method further includes obtaining the training data.

Allocating the training data to the plurality of working machines further includes allocating the training data to the plurality of working machines in accordance with an identification of each working machine.

Furthermore, in the solutions disclosed in the first to third embodiments, in implementations, aggregating the local weight and the local loss function value calculated by each working machine based on each piece of data to obtain the current weight and the current loss function value can include summing local weights calculated by each working machine based on each piece of data to obtain the current weight; and summing local loss function values obtained by each work machine based on each piece of data to obtain the current local loss function.

According to a training method for a machine learning system proposed by the third embodiment of the present disclosure, each work machine processes only one data piece at a time, and a local weight and a local loss function value calculated according to the data piece are aggregated, thus achieving an effect of accurately updating a weight and a loss function value in a small extent after each calculation, and avoiding the problems of online learning being susceptible to noise in data in existing technologies. At the same time, abnormality detection is performed after obtaining a current weight and/or a current loss function value. In response to detecting that the obtained current weight and/or the obtained current loss function value belong(s) to a first type of abnormality or a second type of abnormality, the current weight and/or the current loss function value that is/are calculated in this calculation may be discarded, and a weight and a loss function value obtained from a previous aggregation are inputted into a machine learning model; or the current weight and/or the current loss function value that is/are calculated at this time are corrected, and updates of a weight and a loss function value obtained by each calculation and aggregation are limited to effective ranges. This avoids the instability of model training, enhances the ability of the system to resist data noise, improves the stability of the machine learning system of online learning, ensures the normal output of the machine learning system, and improves the service capabilities of the machine learning system after going online.

Fourth Embodiment

Figure 4:
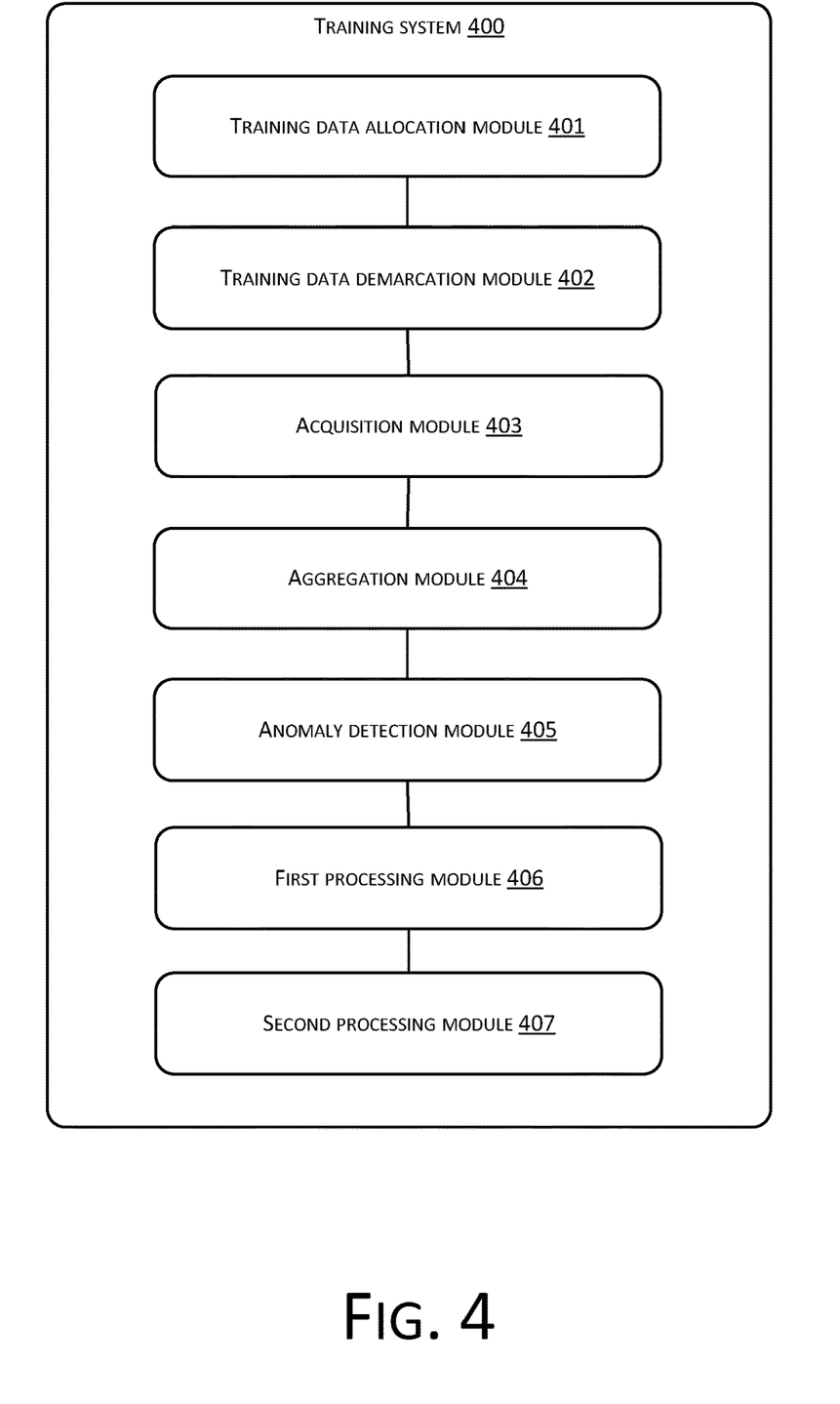
FIG. 4 is a block diagram of a training system for a machine learning system in accordance with a fourth embodiment of the present disclosure.

The fourth embodiment of the present disclosure provides a training system for a machine learning system. FIG. 4 is a block diagram of a training system for a machine learning system according to the fourth embodiment of the present disclosure. In implementations, machine learning system may be a distributed machine learning system. As shown in FIG. 4, the training system 400 includes a training data allocation module 401 configured to allocate the training data to a plurality of working machines; a training data demarcation module 402 configured to divide training data allocated by each working machine into a plurality of data pieces; an acquisition module 403 configured to obtain a local weight and a local loss function value calculated by each working machine based on each data piece; an aggregation module 404 configured to aggregate the local weight and the local loss function value calculated by each work machine based on each data piece to obtain a current weight and a current loss function value; an anomaly detection module 405 configured to perform model abnormality detection using the current weight and/or the current loss function value; a first processing module 406 configured to input a weight and a loss function value of a previous aggregation to the machine learning system for training in response to a result of the model abnormality detection being a first type of abnormality; and a second processing module 407 configured to modify the current weight and/or the current loss function value to a current weight and/or a current loss function value within a first threshold, and input thereof to the machine learning system for training, in response to the result of the model abnormality detection being a second type of abnormality.

According to a training system for a machine learning system proposed by the fourth embodiment of the present disclosure, each work machine processes only one data piece at a time, and a local weight and a local loss function value calculated according to the data piece are aggregated, thus achieving an effect of accurately updating a weight and a loss function value in a small extent after each calculation, and avoiding the problems of online learning being susceptible to noise in data in existing technologies. At the same time, abnormality detection is performed after obtaining a current weight and/or a current loss function value. In response to detecting that the obtained current weight and/or the obtained current loss function value belong(s) to a first type of abnormality or a second type of abnormality, the current weight and/or the current loss function value that is/are calculated in this calculation may be discarded, and a weight and a loss function value obtained from a previous aggregation are inputted into a machine learning model; or the current weight and/or the current loss function value that is/are calculated at this time are corrected, and updates of a weight and a loss function value obtained by each calculation and aggregation are limited to effective ranges. This avoids the instability of model training, enhances the ability of the system to resist data noise, improves the stability of the machine learning system of online learning, ensures the normal output of the machine learning system, and improves the service capabilities of the machine learning system after going online.

Fifth Embodiment

Figure 5:
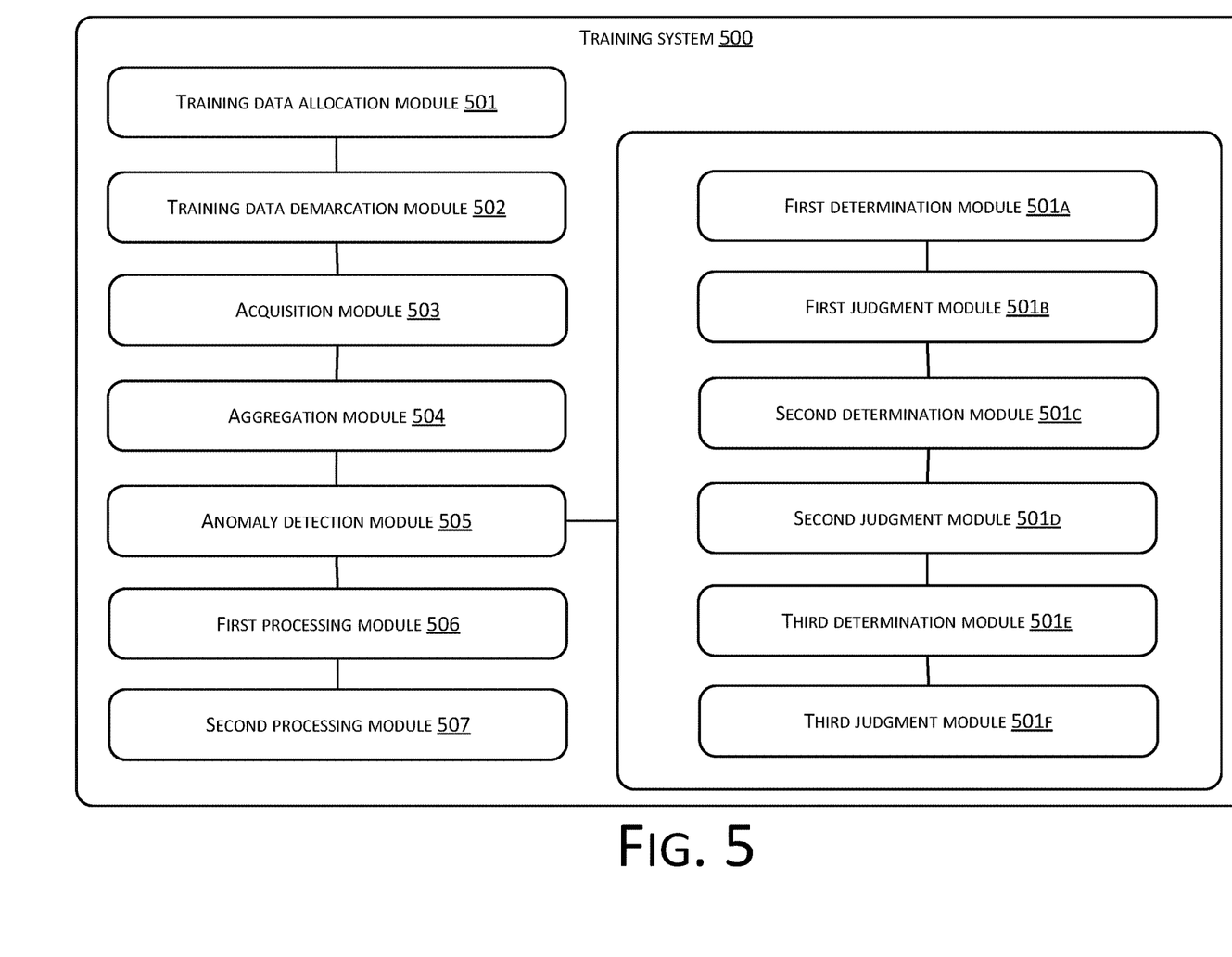
FIG. 5 is a block diagram of a training system for a machine learning system in accordance with a fifth embodiment of the present disclosure.

The fifth embodiment of the present disclosure provides a training system for a machine learning system. FIG. 5 is a block diagram of a training system for a machine learning system according to the fifth embodiment of the present disclosure. In implementations, the machine learning system may be a distributed machine learning system. As shown in FIG. 5, the training system 500 includes a training data allocation module 501 configured to allocate the training data to a plurality of working machines; a training data demarcation module 502 configured to divide training data allocated by each working machine into a plurality of data pieces; an acquisition module 503 configured to obtain a local weight and a local loss function value calculated by each working machine based on each data piece; an aggregation module 504 configured to aggregate the local weight and the local loss function value calculated by each work machine based on each data piece to obtain a current weight and a current loss function value; an anomaly detection module 505 configured to perform model abnormality detection using the current weight and/or the current loss function value; a first processing module 506 configured to input a weight and a loss function value of a previous aggregation to the machine learning system for training in response to a result of the model abnormality detection being a first type of abnormality; and a second processing module 507 configured to modify the current weight and/or the current loss function value to a current weight and/or a current loss function value within a first threshold, and input thereof to the machine learning system for training, in response to the result of the model abnormality detection being a second type of abnormality.

In the embodiment, the anomaly detection module 505 includes a first determination sub-module 505a configured to determine whether the current loss function value is greater than k times of a loss function value of a previous aggregation; a first judgment sub-module 505b configured to determine that a result of the model abnormality detection is a first type of abnormality in response to determining whether the current loss function value is greater than k times of the loss function value of the previous aggregation; a second determination sub-module 505c configured to determine whether an absolute value of a maximum value and/or a minimum value of elements in the current weight is greater than a preset second threshold; and a second judgment sub-module 505d configured to determine that the result of the model abnormality detection is a second type of abnormality in response to determining whether the absolute value of the maximum value and/or the minimum value of the elements in the current weight is greater than the preset second threshold.

The anomaly detection module 505 further includes a third determination sub-module 505e configured to determine whether an average value of loss function values of first n aggregations is greater than a loss function value of a first aggregation; and a third judgment sub-module 505f configured to determine that the result of the model abnormality detection is the first type of abnormality in response to determining that the average value of the loss function values of the first n aggregations is larger than the loss function value of the first aggregation.

In implementations, when the result of the model abnormality detection is the second type of abnormality, modifying the current weight and/or the current loss function value to the current weight and/or the current loss function value within the second threshold includes subtracting elements having the absolute value of the maximum value and/or the minimum value being greater than the preset second threshold by the second threshold to obtain a current weight in which each element is located within the second threshold.

According to a training system for a machine learning system proposed by the fifth embodiment of the present disclosure, each work machine processes only one data piece at a time, and a local weight and a local loss function value calculated according to the data piece are aggregated, thus achieving an effect of accurately updating a weight and a loss function value in a small extent after each calculation, and avoiding the problems of online learning being susceptible to noise in data in existing technologies. At the same time, abnormality detection is performed after obtaining a current weight and/or a current loss function value. In response to detecting that the obtained current weight and/or the obtained current loss function value belong(s) to a first type of abnormality or a second type of abnormality, the current weight and/or the current loss function value that is/are calculated in this calculation may be discarded, and a weight and a loss function value obtained from a previous aggregation are inputted into a machine learning model; or the current weight and/or the current loss function value that is/are calculated at this time are corrected, and updates of a weight and a loss function value obtained by each calculation and aggregation are limited to effective ranges. This avoids the instability of model training, enhances the ability of the system to resist data noise, improves the stability of the machine learning system of online learning, ensures the normal output of the machine learning system, and improves the service capabilities of the machine learning system after going online.

Sixth Embodiment

Figure 6:
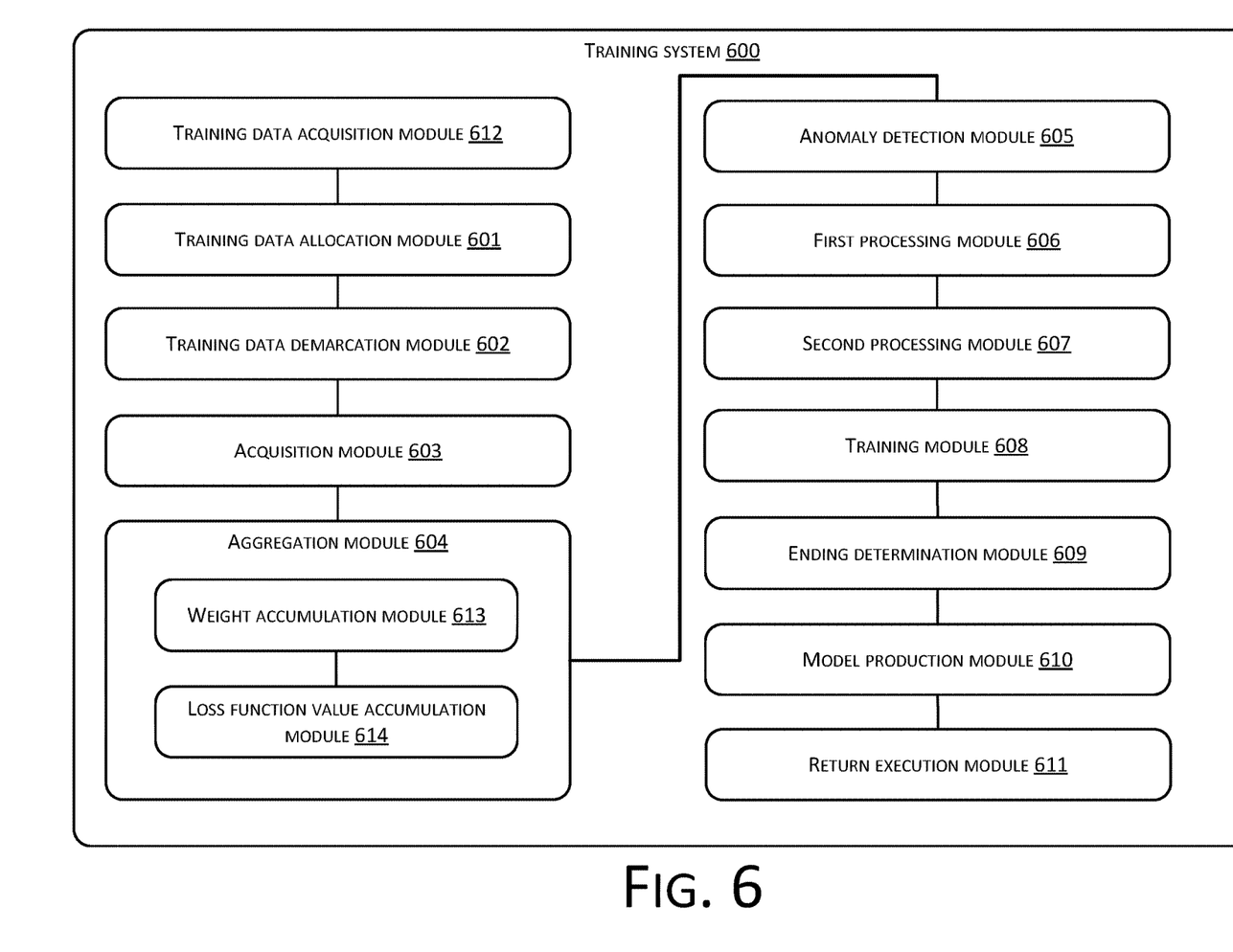
FIG. 6 is a block diagram of a training system for a machine learning system in accordance with a sixth embodiment of the present disclosure.

The sixth embodiment of the present disclosure provides a training system for a machine learning system. FIG. 6 is a block diagram of a training system for a machine learning system according to the sixth embodiment of the present disclosure. In implementations, the machine learning system may be a distributed machine learning system. As shown in FIG. 6, the training system 600 includes a training data allocation module 601 configured to allocate the training data to a plurality of working machines; a training data demarcation module 602 configured to divide training data allocated by each working machine into a plurality of data pieces; an acquisition module 603 configured to obtain a local weight and a local loss function value calculated by each working machine based on each data piece; an aggregation module 604 configured to aggregate the local weight and the local loss function value calculated by each work machine based on each data piece to obtain a current weight and a current loss function value; an anomaly detection module 605 configured to perform model abnormality detection using the current weight and/or the current loss function value; a first processing module 606 configured to input a weight and a loss function value of a previous aggregation to the machine learning system for training in response to a result of the model abnormality detection being a first type of abnormality; and a second processing module 607 configured to modify the current weight and/or the current loss function value to a current weight and/or a current loss function value within a first threshold, and input thereof to the machine learning system for training, in response to the result of the model abnormality detection being a second type of abnormality.

In implementations, the system further includes a training module 608 configured to input the current weight and/or the current loss function value into the machine learning system for training in response to the result of the model abnormality detection being normal.

In implementations, the system further includes an ending determination module 609 configured to determine whether the training is ended; a model production module 610 configured to generate a model in response to determining that the training is ended; and a return execution module 611 configured to perform obtaining the local weight and the local loss function value calculated by each working machine based on each piece of data again in response to determining that the training is not ended.

In implementations, the ending determination module 609 is configured to determine that the training is ended in response to detecting that the current loss function value and the loss function value of the previous aggregation are smaller than the third threshold.

In implementations, the system may further include a training data acquisition module 612 configured to obtain the training data. The training data allocation module 601 is configured to allocate the training data to the plurality of working machines according to an identification of each working machine.

In implementations, the aggregation module 604 includes a weight accumulation module 613 configured to sum up local weights calculated by each working machine based on each piece of data to obtain the current weight; and a loss function value accumulation module 614 configured to sum up local loss function values obtained by each work machine based on each piece of data to obtain the current local loss function.

According to a training system for a machine learning system proposed by the sixth embodiment of the present disclosure, each work machine processes only one data piece at a time, and a local weight and a local loss function value calculated according to the data piece are aggregated, thus achieving an effect of accurately updating a weight and a loss function value in a small extent after each calculation, and avoiding the problems of online learning being susceptible to noise in data in existing technologies. At the same time, abnormality detection is performed after obtaining a current weight and/or a current loss function value. In response to detecting that the obtained current weight and/or the obtained current loss function value belong(s) to a first type of abnormality or a second type of abnormality, the current weight and/or the current loss function value that is/are calculated in this calculation may be discarded, and a weight and a loss function value obtained from a previous aggregation are inputted into a machine learning model; or the current weight and/or the current loss function value that is/are calculated at this time are corrected, and updates of a weight and a loss function value obtained by each calculation and aggregation are limited to effective ranges. This avoids the instability of model training, enhances the ability of the system to resist data noise, improves the stability of the machine learning system of online learning, ensures the normal output of the machine learning system, and improves the service capabilities of the machine learning system after going online.

Figure 7:
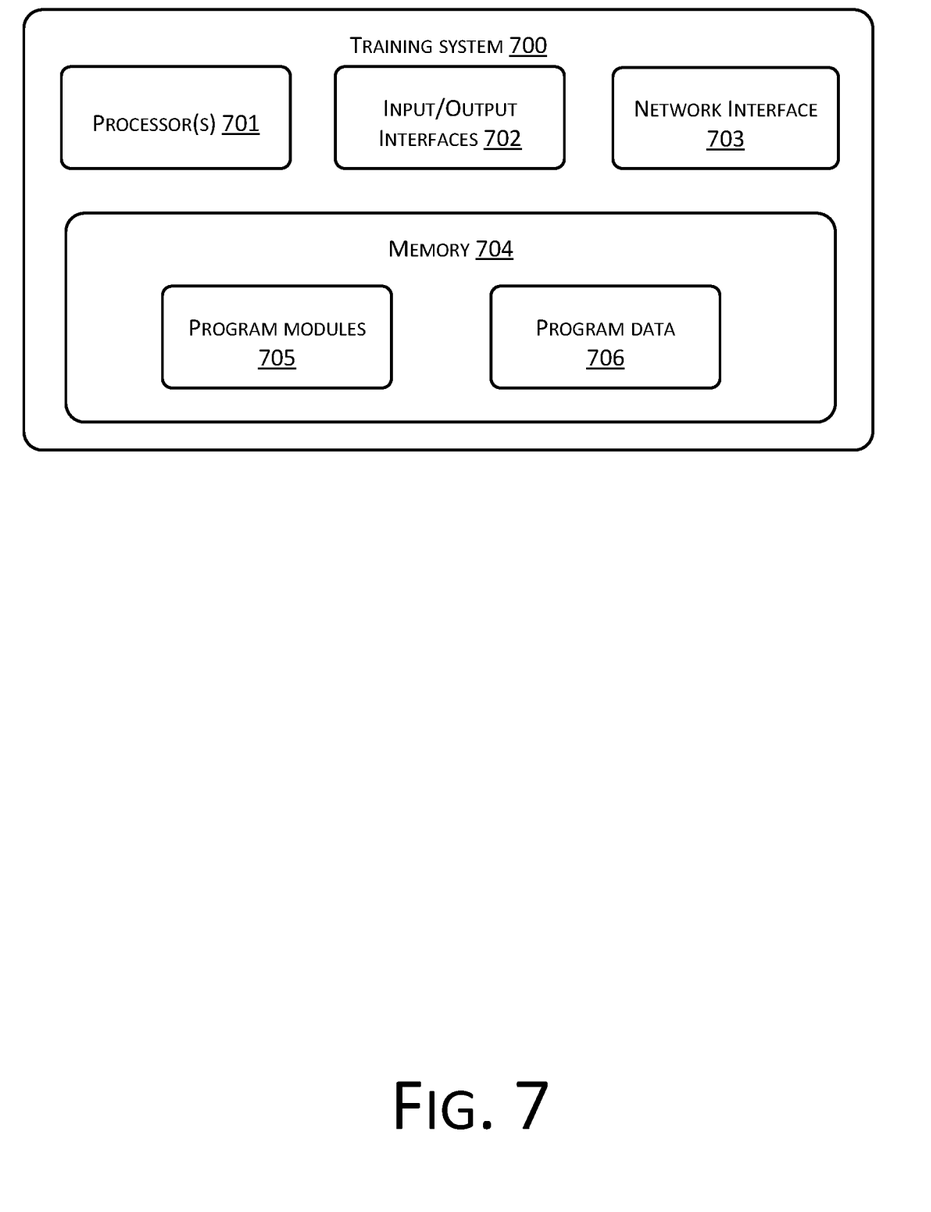
FIG. 7 is a block diagram of the training system as described in FIGS. 4-6 in more detail.

FIG. 7 shows an example system 700 as described in FIGS. 4-6 in further detail. In implementations, the system 700 may include one or more computing devices. In implementations, the system 700 may be a part of one or more computing devices, e.g., implemented or run by the one or more computing devices. In implementations, the one or more computing devices may be located in a single place or distributed among a plurality of network devices over a network. In a typical configuration, a computing device includes one or more processors (CPU), an input/output interface, a network interface, and memory. By way of example and not limitation, the system 700 may also include one or more processors 701, an input/output (I/O) interface 702, a network interface 703, and memory 704.

The memory 704 may include a form of computer readable media such as a volatile memory, a random access memory (RAM) and/or a non-volatile memory, for example, a read-only memory (ROM) or a flash RAM. The memory 704 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 704 may include program modules 705 and program data 706. The program modules 705 may include one or more of the foregoing modules, sub-modules, and/or units of the systems 400, 500 and/or 600 as described in FIGS. 4-6.

Due to their basically similarities to the method embodiments, the description of the apparatus embodiments is relatively simple, and relevant parts can be referenced to the description of the method embodiments.

Each embodiment in the present specification is described in a progressive manner, and each embodiment has an emphasis that is different from those of other embodiments. Same or similar parts among the embodiments can be referenced with each other.

One skilled in the art should understand that the embodiments of the present disclosure can be provided as a method, an apparatus, or a computer program product. Therefore, the embodiments of the present disclosure may take a form of a complete hardware embodiment, a complete software embodiment, or an embodiment that is a combination of software and hardware. Moreover, the embodiments of the present disclosure may take a form of a computer program product implemented in a form of one or more computer-usable storage media (which include, but are not limited to, a magnetic storage device, CD-ROM, an optical storage device, etc.) having computer-usable program codes embodied therein.

In a typical configuration, a computing device includes one or more processors (CPU), an input/output interface, a network interface, and memory. The memory may include a form of computer readable media such as a volatile memory, a random access memory (RAM) and/or a non-volatile memory, for example, a read-only memory (ROM) or a flash RAM. The memory is an example of a computer readable media. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The embodiments of the present disclosure are described with reference to flowcharts and/or block diagrams of methods, terminal devices (systems), and computer program products according to the embodiments of the present disclosure. It should be understood that each flow and/or block in the flowcharts and/or block diagrams, and combinations of the flows and/or blocks in the flowcharts and/or block diagrams may be implemented by computer program instructions. The computer program instructions may be provided to a processor of a general purpose computer, a special purpose computer, an embedded processor, or other programmable data processing terminal device to produce a machine, such that an apparatus is created for implementing functions specified in one or more flows of a flowchart and/or one or more blocks of a block diagram through an execution of the instructions by the processor of the computer or other programmable data processing terminal device.

These computer program instructions may also be stored in a computer readable storage device capable of directing a computer or other programmable data processing terminal device to operate in a specific manner, so that instructions stored in the computer readable storage device generate an article of manufacture including an instruction apparatus. The instruction apparatus implements functions specified in one or more flows of a flowchart and/or one or more blocks of a block diagram.

These computer program instructions may also be loaded onto a computer or other programmable data processing terminal device, such that a series of operating operations are performed on the computer or other programmable terminal device to generate a computer-implemented process. The instructions executed in the computer or other programmable terminal device provide operations for implementing functions specified in one or more flows of a flowchart and/or one or more blocks of a block diagram.

Although the preferred embodiments of the embodiments of the present disclosure have been described, one skilled in the art can make additional changes and modifications to these embodiments once the basic inventive concepts are learned. Therefore, the appended claims are intended to be interpreted as including the preferred embodiments and all changes and modifications that fall within the scope of the embodiments of the present disclosure.

Finally, it should also be noted that relational terms such as first and second, etc., are only used to distinguish one entity or operation from another entity or operation in the present disclosure, and do not necessarily require or imply an existence of any such relationship or order between these operations or entities. Moreover, terms "include", "contain" or any other variations thereof are intended to cover a non-exclusive inclusion, such that a process, method, article, or terminal device that includes a series of elements includes not only these elements, but also includes other elements that are not explicitly listed, or also includes elements that are inherent in such process, method, article, or terminal device. Without any further limitation, an element defined by a statement "including a . . . " does not exclude a process, method, article, or terminal device including the element from further including another identical element.

A training method and a training system for a machine learning system provided in the present disclosure are described in detail above. The present disclosure uses specific examples for illustrating the principles and implementations of the present disclosure. The description of the above embodiments is merely used for facilitating the understanding of the methods and the core ideas of the present disclosure. At the same time, for one of ordinary skill in the art, changes can be made to specific implementations and application scopes based on the ideas of the present disclosure. In summary, the content of the present specification should not be construed as limitations to the present disclosure.

What is claimed is:

1. A method for a machine learning system, comprising:
    allocating training data to a plurality of working machines;
    obtaining a weight and a loss function value locally calculated by each working machine based on a subset of a respective data piece of the training data allocated to the respective working machine;
    aggregating the weight and the loss function value locally calculated by each working machine to obtain a current weight and a current loss function value;
    performing model abnormality detection using the current weight and/or the current loss function value;
    inputting a weight and a loss function value of a previous aggregation to the machine learning system for training in response to a result of the model abnormality detection being a first type of abnormality; and modifying the current weight and/or the current loss function value to a current weight and/or a current loss function value within a first threshold in response to the result of the model abnormality detection being a second type of abnormality, and inputting thereof to the machine learning system for training.

2. The method of claim 1, wherein performing the model abnormality detection using the current weight and/or the current loss function value comprises:
determining whether the current loss function value is greater than k times of a loss function value of a previous aggregation; and
determining that a result of the model abnormality detection is a first type of abnormality in response to determining whether the current loss function value is greater than k times of the loss function value of the previous aggregation.

3. The method of claim 1, wherein performing the model abnormality detection using the current weight and/or the current loss function value comprises:
determining whether an absolute value of a maximum value and/or a minimum value of elements in the current weight is greater than a preset second threshold; and
determining that the result of the model abnormality detection is a second type of abnormality in response to determining whether the absolute value of the maximum value and/or the minimum value of the elements in the current weight is greater than the preset second threshold.

4. The method of claim 3, wherein modifying the current weight and/or the current loss function value to the current weight and/or the current loss function value within the first threshold in response to the result of the model abnormality detection being the second type of abnormality comprises subtracting elements having the absolute value of the maximum value and/or the minimum value being greater than the first threshold by the first threshold to obtain a current weight in which each element is located within the first threshold.

5. The method of claim 1, wherein performing the model abnormality detection using the current weight and/or the current loss function value comprises:
determining whether an average value of loss function values of first n aggregations is greater than a loss function value of a first aggregation; and
determining that the result of the model abnormality detection is the first type of abnormality in response to determining that the average value of the loss function values of the first n aggregations is larger than the loss function value of the first aggregation.

6. The method of claim 1, wherein: after performing the model abnormality detection using the current weight and/or the current loss function value, the method further comprises inputting the current weight and/or the current loss function value into the machine learning system for training in response to a result of the model abnormality detection being normal.

7. The method of claim 6, wherein: after inputting the current weight and/or the current loss function value into the machine learning system for training in response to the result of the model abnormality detection being normal, the method further comprises:
determining whether the training is ended;
generating a model in response to determining that the training is ended; and
repeating the obtaining of the weight and the loss function value locally calculated by each working machine again in response to determining that the training is not ended.

8. The method of claim 6, wherein determining whether the training is ended comprises determining that the training is ended in response to detecting that the current loss function value and the loss function value of the previous aggregation are smaller than a third threshold.

9. The method of claim 1, wherein: before allocating the training data to the plurality of working machines, the method further comprises:
obtaining the training data; and
allocating the training data to the plurality of working machines in accordance with an identification of each working machine.

10. The method of claim 1, wherein aggregating the weight and the loss function value locally calculated by each working machine to obtain the current weight and the current loss function value comprises:
summing weights locally calculated by each working machine to obtain the current weight; and
summing loss function values locally calculated by each working machine to obtain the current local loss function.

11. A system comprising:
one or more processors;
memory;
a training data allocation module stored in the memory and executable by the one or more processors to allocate the training data to a plurality of working machines;
an acquisition module stored in the memory and executable by the one or more processors to obtain a weight and a loss function value locally calculated by each working machine based on a subset of a respective data piece of the training data allocated to the respective working machine;
an aggregation module stored in the memory and executable by the one or more processors to aggregate the weight and the loss function value locally calculated by each working machine to obtain a current weight and a current loss function value;
an anomaly detection module stored in the memory and executable by the one or more processors to perform model abnormality detection using the current weight and/or the current loss function value;
a first processing module stored in the memory and executable by the one or more processors to input a weight and a loss function value of a previous aggregation to the system for training in response to a result of the model abnormality detection being a first type of abnormality; and
a second processing module stored in the memory and executable by the one or more processors to modify the current weight and/or the current loss function value to a current weight and/or a current loss function value within a first threshold, and input thereof to the machine learning system for training, in response to the result of the model abnormality detection being a second type of abnormality.

12. The system of claim 11, wherein the anomaly detection module comprises:
a first determination sub-module configured to determine whether the current loss function value is greater than k times of a loss function value of a previous aggregation; and a first judgment sub-module configured to determine that a result of the model abnormality detection is a first type of abnormality in response to determining whether the current loss function value is greater than k times of the loss function value of the previous aggregation.

13. The system of claim 11, wherein the anomaly detection module comprises:
a second determination sub-module configured to determine whether an absolute value of a maximum value and/or a minimum value of elements in the current weight is greater than a preset second threshold; and
a second judgment sub-module configured to determine that the result of the model abnormality detection is a second type of abnormality in response to determining whether the absolute value of the maximum value and/or the minimum value of the elements in the current weight is greater than the preset second threshold.

14. The system of claim 13, wherein: when the result of the model abnormality detection is the second type of abnormality, modifying the current weight and/or the current loss function value to the current weight and/or the current loss function value within the first threshold comprises subtracting elements having the absolute value of the maximum value and/or the minimum value being greater than a preset second threshold by the first threshold to obtain a current weight in which each element is located within the first threshold.

15. The system of claim 11, wherein the anomaly detection module comprises:
a third determination sub-module configured to determine whether an average value of loss function values of first n aggregations is greater than a loss function value of a first aggregation; and
a third judgment sub-module configured to determine that the result of the model abnormality detection is the first type of abnormality in response to determining that the average value of the loss function values of the first n aggregations is larger than the loss function value of the first aggregation.

16. The system of claim 11, further comprising a training module configured to input the current weight and/or the current loss function value into the machine learning system for training in response to the result of the model abnormality detection being normal.

17. The system of claim 16, further comprising:
an ending determination module configured to determine whether the training is ended;
a model production module configured to generate a model in response to determining that the training is ended; and
a return execution module configured to perform obtaining the weight and the loss function value locally calculated by each working machine again in response to determining that the training is not ended.

18. The system of claim 17, wherein the ending determination module is configured to determine that the training is ended in response to detecting that the current loss function value and the loss function value of the previous aggregation are smaller than a third threshold.

19. The system of claim 11, further comprising a training data acquisition module configured to obtain the training data, the training data allocation module being configured to allocate the training data to the plurality of working machines according to an identification of each working machine.

20. One or more computer readable media storing executable instructions that, when executed by one or more processors of a system, cause the one or more processors to perform acts comprising:
allocating training data to a plurality of working machines;
obtaining a weight and a loss function value locally calculated by each working machine based on a subset of a respective data piece of the training data allocated to the respective working machine;
aggregating the weight and the loss function value locally calculated by each working machine to obtain a current weight and a current loss function value;
performing model abnormality detection using the current weight and/or the current loss function value;
inputting a weight and a loss function value of a previous aggregation to the system for training in response to a result of the model abnormality detection being a first type of abnormality; and
modifying the current weight and/or the current loss function value to a current weight and/or a current loss function value within a first threshold in response to the result of the model abnormality detection being a second type of abnormality, and inputting thereof to the machine learning system for training.

* * * * *